US 011883888B2

(12) United States Patent
Filho et al.

(10) Patent No.: US 11,883,888 B2
(45) Date of Patent: Jan. 30, 2024

(54) MODULAR DRILL WITH ENHANCED BUMP-OFF CAPABILITY

(71) Applicant: Kennametal Inc., Latrobe, PA (US)

(72) Inventors: Ruy Frota de Souza Filho, Latrobe, PA (US); Marcelo Euripedes Silva, Piracicabo (BR); Nicholas J. Henry, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 159 days.

(21) Appl. No.: 17/359,977

(22) Filed: Jun. 28, 2021

(65) Prior Publication Data

US 2022/0410285 A1 Dec. 29, 2022

(51) Int. Cl.
*B23B 51/02* (2006.01)

(52) U.S. Cl.
CPC ...... *B23B 51/02* (2013.01); *B23B 2231/0204* (2013.01); *B23B 2251/02* (2013.01); *B23B 2251/082* (2013.01); *B23B 2251/408* (2013.01); *B23B 2251/50* (2013.01)

(58) Field of Classification Search
CPC ............ B23B 51/0004; B23B 51/0003; B23B 51/0002; B23B 2270/09; B23B 2251/02; B23B 2240/00; B23C 2210/02; B23C 2270/08; B23C 2240/24
See application file for complete search history.

(56) References Cited

U.S. PATENT DOCUMENTS

| 124,089 A | 2/1872 | Shepardson |
| 318,994 A | 6/1885 | Lake |
| 1,451,548 A | 4/1923 | Henry et al. |
| 1,461,023 A | 7/1923 | Becker |

(Continued)

FOREIGN PATENT DOCUMENTS

| AT | 349850 B | 4/1979 |
| CN | 101801576 A | 9/2012 |

(Continued)

OTHER PUBLICATIONS

Jun. 30, 2021 Non-Final Office action (3 months) (US Only) U.S. Appl. No. 16/445,741 (20190388976), 12 pages.

(Continued)

*Primary Examiner* — Alan Snyder
(74) *Attorney, Agent, or Firm* — Larry R. Meenan

(57) ABSTRACT

A rotary cutting tool with enhanced bump-off capability is disclosed. The cutting tool includes a tool shank having a pocket. A replaceable cutting head is at least partially disposed within the pocket of the tool shank with an interference fit. A coupling pin assembly is at least partially received within a bore of the tool shank. The coupling pin assembly comprises a sleeve member and a coupling pin at least partially disposed within the sleeve member. The sleeve member includes an upper portion and a lower portion having a non-circular cross-sectional shape with a bump-off surface. An actuation screw contacts the coupling pin assembly and causes the replaceable cutting head to move relative to the tool shank. The bump-off surface of the (Continued)

lower portion of the sleeve member extends radially outward with respect to the coupling pin by a distance, D, thereby providing enhanced bump-off capability.

12 Claims, 13 Drawing Sheets

(56) References Cited

U.S. PATENT DOCUMENTS

| | | |
|---|---|---|
| 1,461,548 A | 7/1923 | West |
| 1,946,158 A | 2/1934 | Gorg |
| 2,167,014 A | 7/1939 | Verderber |
| 2,399,939 A | 5/1946 | Phillips |
| 2,400,856 A | 5/1946 | Thompson |
| 2,485,799 A | 10/1949 | Woytych |
| 2,801,614 A | 8/1957 | Dieterich |
| 2,847,225 A | 8/1958 | Kosinski |
| 3,049,033 A | 8/1962 | Benjamin |
| 3,311,023 A | 3/1967 | Kaiser |
| 3,436,990 A | 4/1969 | Tourison |
| 4,611,672 A | 9/1986 | Holzl |
| 4,632,593 A | 12/1986 | Stashko |
| 4,726,268 A | 2/1988 | Erickson |
| 4,744,704 A | 5/1988 | Galvefors |
| 4,813,829 A | 3/1989 | Koppelmann |
| 4,854,789 A | 8/1989 | Evseanko, Jr. |
| 4,913,607 A | 4/1990 | von Haas |
| 5,407,308 A | 4/1995 | Takayoshi |
| 5,452,971 A | 9/1995 | Nevills |
| 5,599,145 A | 2/1997 | Reinauer et al. |
| 5,622,460 A | 4/1997 | Satran et al. |
| 5,678,645 A | 10/1997 | Tibbitts et al. |
| 5,704,742 A | 1/1998 | Reinauer |
| 5,820,318 A | 10/1998 | Danielsson et al. |
| 5,904,448 A | 5/1999 | Lee |
| 5,904,455 A | 5/1999 | Krenzer et al. |
| 5,947,660 A | 9/1999 | Karlsson et al. |
| 5,957,631 A | 9/1999 | Hecht |
| 5,957,635 A | 9/1999 | Nuzzi et al. |
| 5,961,259 A | 10/1999 | Ziegler |
| 5,971,673 A | 10/1999 | Berglund et al. |
| 6,012,881 A | 1/2000 | Scheer |
| 6,109,152 A | 8/2000 | Hecht |
| 6,109,841 A | 8/2000 | Johne |
| 6,196,769 B1 | 3/2001 | Satran et al. |
| 6,276,879 B1 | 8/2001 | Hecht |
| 6,447,222 B2 | 9/2002 | Kojima |
| 6,485,235 B1 | 11/2002 | Mast et al. |
| 6,506,003 B1 | 1/2003 | Erickson |
| 6,514,019 B1 | 2/2003 | Schulz |
| 6,530,728 B2 | 3/2003 | Eriksson |
| 6,582,164 B1 | 6/2003 | McCormick |
| 6,783,307 B2 | 8/2004 | Lindblom |
| 6,783,308 B2 | 8/2004 | Lindblom |
| 7,070,367 B2 | 7/2006 | Krenzer |
| 7,131,799 B2 | 11/2006 | Stokey et al. |
| 7,309,196 B2 | 12/2007 | Ruy Frota de Souza |
| 7,311,480 B2 | 12/2007 | Heule et al. |
| 7,360,974 B2 | 4/2008 | Borschert et al. |
| 7,377,730 B2 | 5/2008 | Hecht et al. |
| 7,407,350 B2 | 8/2008 | Hecht et al. |
| 7,467,915 B2 | 12/2008 | de Souza Filho |
| 7,478,983 B2 | 1/2009 | Guy |
| 7,625,161 B1 | 12/2009 | Ruy Frota de Souza |
| 7,972,094 B2 | 7/2011 | Men et al. |
| 7,997,836 B2 | 8/2011 | Kim et al. |
| 8,312,615 B2 | 11/2012 | Frota de Souza Filho |
| 8,449,227 B2 | 5/2013 | Danielsson |
| 8,550,756 B2 | 10/2013 | Borschert et al. |
| 8,678,722 B2 | 3/2014 | Aare |
| 8,702,356 B2 | 4/2014 | Hecht et al. |
| 8,721,235 B2 | 5/2014 | Kretzschmann et al. |
| 8,784,018 B2 | 7/2014 | Pabel |
| 8,840,347 B2 | 9/2014 | Aare |
| 8,876,444 B1 | 11/2014 | Chanturidze |
| 8,876,446 B2 | 11/2014 | Shaheen |
| 8,882,413 B2 | 11/2014 | Hecht |
| 8,992,143 B2 | 3/2015 | Glimpel et al. |
| 9,073,129 B2 | 7/2015 | Craig et al. |
| 9,108,251 B2 | 8/2015 | Craig |
| 9,162,295 B2 | 10/2015 | Päbel et al. |
| 9,205,498 B2 | 12/2015 | Jaeger |
| 9,468,979 B2 | 10/2016 | Hecht |
| 9,545,699 B2 | 1/2017 | Furusawa et al. |
| 9,555,484 B2 | 1/2017 | Koga |
| 9,770,766 B2 | 9/2017 | Singer-Schnoeller |
| 9,895,754 B2 | 2/2018 | Mani |
| 10,173,271 B2 * | 1/2019 | Hecht .................... B23B 51/02 |
| 10,207,337 B2 | 2/2019 | Filho |
| 10,213,845 B2 | 2/2019 | Schwagerl et al. |
| 10,471,522 B2 | 11/2019 | Yamamoto et al. |
| 2001/0026738 A1 | 10/2001 | Kojima |
| 2002/0015623 A1 | 2/2002 | Eriksson |
| 2002/0168239 A1 | 11/2002 | Mast et al. |
| 2003/0091402 A1 | 5/2003 | Lindblom |
| 2003/0091403 A1 | 5/2003 | Lindblom |
| 2003/0219321 A1 | 11/2003 | Borschert et al. |
| 2005/0098359 A1 | 5/2005 | Lee |
| 2006/0051172 A1 | 3/2006 | Johnson et al. |
| 2007/0274794 A1 | 11/2007 | Cirino |
| 2008/0003072 A1 | 1/2008 | Kim et al. |
| 2008/0101878 A1 | 5/2008 | Skilberg |
| 2010/0021253 A1 | 1/2010 | Frejd |
| 2010/0104384 A1 | 4/2010 | Orlov et al. |
| 2010/0303561 A1 | 12/2010 | Fouquer |
| 2010/0322723 A1 | 12/2010 | Danielsson |
| 2010/0322731 A1 | 12/2010 | Aare |
| 2011/0008114 A1 | 1/2011 | Wang |
| 2011/0110735 A1 | 5/2011 | Klettenheimer et al. |
| 2011/0110739 A1 | 5/2011 | Frisendahl |
| 2011/0114393 A1 | 5/2011 | Dolan et al. |
| 2011/0236145 A1 | 9/2011 | Päbel et al. |
| 2012/0014760 A1 | 1/2012 | Glimpel et al. |
| 2012/0014860 A1 | 1/2012 | Harris |
| 2012/0148358 A1 | 6/2012 | Hecht et al. |
| 2012/0230787 A1 | 9/2012 | Harif |
| 2013/0042462 A1 | 2/2013 | Frota De Souza Filho |
| 2013/0259590 A1 | 10/2013 | Shaheen |
| 2014/0154023 A1 | 6/2014 | Craig |
| 2014/0255117 A1 | 9/2014 | Tseng |
| 2014/0353931 A1 | 12/2014 | Frota De Souza Filho et al. |
| 2014/0360334 A1 | 12/2014 | Singer-Schnoeller |
| 2014/0363257 A1 | 12/2014 | Parker |
| 2015/0147128 A1 | 5/2015 | Saji |
| 2015/0306686 A1 | 10/2015 | Mani |
| 2015/0328693 A1 | 11/2015 | Koga |
| 2015/0360300 A1 | 12/2015 | Hecht |
| 2016/0067785 A1 | 3/2016 | Wang et al. |
| 2016/0263664 A1 | 9/2016 | Son et al. |
| 2017/0028479 A1 | 2/2017 | Haimer |
| 2018/0169771 A1 | 6/2018 | Filho et al. |
| 2019/0126361 A1 | 5/2019 | Hecht et al. |
| 2020/0180047 A1 * | 6/2020 | Jager .................... B23B 31/1075 |

FOREIGN PATENT DOCUMENTS

| | | |
|---|---|---|
| CN | 101801576 B | 9/2012 |
| CN | 103692001 A | 4/2014 |
| CN | 102413974 A | 6/2014 |
| CN | 102413974 B | 6/2014 |
| CN | 205020901 U | 2/2016 |
| CN | 103249511 A | 8/2016 |
| CN | 103249511 B | 8/2016 |
| CN | 109365844 A | 12/2020 |
| CN | 109365844 B | 12/2020 |
| DE | 803143 | 3/1951 |
| DE | 7043832 | 3/1971 |
| DE | 3912503 A1 | 3/1990 |
| DE | 19710996 | 12/1999 |
| DE | 19834635 A1 | 2/2000 |
| DE | 19834635 C2 | 7/2001 |
| DE | 202011050277 | 7/2012 |
| EP | 0343653 A1 | 11/1989 |
| EP | 0343653 | 7/1991 |

(56) References Cited

FOREIGN PATENT DOCUMENTS

| | | |
|---|---|---|
| EP | 1864733 | 12/2007 |
| GB | 1341651 | 12/1975 |
| JP | 2000084718 | 3/2000 |
| JP | 2004261931 | 9/2004 |
| JP | 2004276134 | 10/2004 |
| JP | 2004306170 | 11/2004 |
| JP | 2004330390 | 11/2004 |
| JP | 2004330391 | 11/2004 |
| JP | 2006007393 A | 1/2006 |
| JP | 2006272472 | 10/2006 |
| JP | 2016193461 | 11/2016 |
| JP | 2016055353 A | 10/2018 |
| SE | 516366 | 4/2001 |
| WO | WO1996034714 A1 | 11/1996 |
| WO | WO2006001551 | 1/2006 |
| WO | WO2009050789 A1 | 4/2009 |
| WO | WO2011058532 | 5/2011 |
| WO | WO13033740 | 3/2013 |
| WO | WO2017207793 A1 | 12/2017 |

OTHER PUBLICATIONS

Oct. 4, 2021 Notice of Allowance U.S. Appl. No. 15/382,120, 9 Pages.
Nov. 29, 2021 Final Office Action U.S. Appl. No. 16/445,741, 17 pages.
Dec. 27, 2021 Notice of Allowance U.S. Appl. No. 15/382,120, 7 Pages.
Jul. 6, 2022 Notice of Allowance U.S. Appl. No. 16/824,537, 20 Pages.
Jul. 20, 2022 Notice of Allowance U.S. Appl. No. 16/824,537, 20 Pages.
Jan. 7, 2022 Non-Final OA—U.S. Appl. No. 16/824,537.
Nov. 25, 2021 Notice of Allowance—CN App. No. 201780076453.4.
Nov. 8, 2021 Foreign OA—DE App. No. 102021106415.5.
Sep. 27, 2021 Notice of Allowance—U.S. Appl. No. 15/382,120.
Apr. 16, 2018 Search Report International Publication WO App. No. 2018109679A1.
Mar. 3, 2023 Foreign Office Action German Application No. DE102022206733.9, 12 Pages.
May 25, 2022 Notice of Allowance US App. No. 20210291280.
Feb. 3, 2023 Foreign Office Action German Application No. DE102018106558, 20 Pages.
Feb. 6, 2018 Office action (3 months) 1 US App. No. 20180169771A1.
Jun. 8, 2021 Office action (3 months) (US Only) US App. No. 20180169771A1.
May 26, 2021 Office Action (non-US) CN App. No. 110062676A.
Apr. 26, 2021 Office Action (non-US) DE App. No. 102019116160A1.
Apr. 14, 2021 Office Action (non-US) DE App. No. 112017006304.
Apr. 14, 2021 Notice of Allowance US App. No. 2020/0180047A1.
Feb. 24, 2021 Notice of Allowance US App. No. 2020/0180047A1.
Feb. 5, 2021 Advisory Action (PTOL-303) 1 US App. No. 2019/0388976.
Jan. 15, 2021 Translation of Office Action (non-US) CN App. No. 110062676A.
Jan. 15, 2021 Office Action (non-US) CN App. No. 110062676A.
Dec. 30, 2020 Final Office Action (US Only) US App. No. 2019/0388976.
Dec. 4, 2020 Notice of Allowance CN App. No. 108687385A.
Nov. 25, 2020 Notice of Allowance US App. No. 2020/0180047A1.
Oct. 22, 2020 Final Office Action (US Only) US App. No. 2020/0180047A1.
Jul. 29, 2020 English translation of First OA for CN App. No. 201810251132X.
Jul. 23, 2020 Office action (3 months) (US Only) US App. No. 2019/0388976.
Jun. 29, 2020 Office Action (non-US) CN App. No. 108687385A.
Jun. 3, 2020 Office Action (non-US) CN App. No. 110062676A.
Jun. 3, 2020 English translation of First OA for CN App No. 201780076453.4.
Apr. 29, 2020 Office action (3 months) (US Only) U.S. Appl. No. 16/214,717.
Feb. 3, 2020 Examination notification CN App. No. 108687385A.
Nov. 15, 2019 Examination notification CN App. No. 110062676A.
Aug. 8, 2019 Final Office Action (US Only) US App. No. 20180169771A1.
Jun. 27, 2019 International Search Report Transmitted WO App. No. 2018109679A1.
Feb. 14, 2019 Office action (3 months) (US Only) US App. No. 20180169771A1.
Nov. 23, 2018 Advisory Action (PTOL-303) 1 US App. No. 20180169771A1.
Oct. 3, 2018 Notice of Allowance U.S. Appl. No. 10/207,337.
Aug. 31, 2018 Final Office Action (US Only) US App. No. 20180169771A1.
Jun. 11, 2018 Office action (3 months) (US Only) U.S. Appl. No. 10/207,337.
Mar. 9, 2023 Foreign Office Action Chinese Application No. CN202110284602.4, 2 Pages.

* cited by examiner

MODULAR DRILL WITH ENHANCED BUMP-OFF CAPABILITY

FIELD OF THE DISCLOSURE

In general, the disclosure relates to cutting tools for performing machining operations on a workpiece, and more particularly, to a modular rotary cutting tool having replaceable cutting heads and methods for securing the replaceable cutting head to a tool shank.

BACKGROUND OF THE DISCLOSURE

Conventional cutting tools can be of both one-part and multi-part design. Cutting tools of the type that make use of a holder part or tool body, as well as a separate, replaceable cutting part or insert, are especially common and are known as a modular cutting tool. Such modular cutting tools may be of widely varying shapes and include, for example, drilling tools, milling tools, thread cutters, and the like.

The basic problem of a modular rotary cutting tool, such as a drill, and the like, is to provide support against the cutting forces that may move the cutting head and pull the cutting head out of the tool shank. A lot of solutions are already proposed in the field of modular drills in order to solve this basic problem. Some of them use the principle of rotation to lock the cutting head (i.e., replaceable cutting tip) in the tool shank. A main problem with self-locking solutions is the fact that the cutting head is held in the tool shank only by forces created by deformation of the walls of the tool shank. Therefore, the high cutting forces of the machining operation, such as drilling and the like, or some vibration, can cause the cutting head to unexpectedly loosen from the tool shank. In addition, the life of the cutting head can be reduced due to less clamping force.

A seemingly better solution is to hold the cutting head by a screw. However, one problem with this solution is the screw mechanism is complex, expensive, and a large amount of space is required to assemble the screw, which reduces the stiffness of the cutting head and limits the application of the cutting tool, particularly in small modular drills. In addition, the modular cutting tool may need to be removed from the machine in order to change the cutting head, thereby increasing operational costs.

Typically, the cutting insert is mounted in the pocket with an interference fit. In some designs, a setscrew is used to clamp and to bump off the cutting insert from the pocket. However, proper positioning of the cutting insert relative to the setscrew may be difficult to the operator. Also, the high forces by the small surfaces of the setscrew that are needed to overcome the interference fit when removing the cutting insert may cause permanent deformation to the components and reduce the life of the mechanism.

SUMMARY OF THE DISCLOSURE

The disclosure describes a solution that is more effective in supporting the cutting forces generated during cutting operations to more securely hold the cutting head in the tool shank, while simplifying manufacturing and reducing cost. Another advantage is avoiding the removal of the cutting tool from the machine when replacing the cutting head. Yet another advantage is the reduction of stress in the cutting tool during machining operations, which increases the life of the cutting tool.

In one aspect, a rotary cutting tool with enhanced bump-off capability comprises a tool shank having a pocket. A replaceable cutting head is at least partially disposed within the pocket of the tool shank with an interference fit. A coupling pin assembly is at least partially received within a bore of the tool shank. The coupling pin assembly comprises a sleeve member and a coupling pin at least partially disposed within the sleeve member. The sleeve member includes an upper portion and a lower portion having a non-circular cross-sectional shape with a bump-off surface. The coupling pin includes an upper portion and a lower portion configured to make partial contact with the bore of the tool shank. An actuation screw contacts the coupling pin assembly and causes the replaceable cutting head to move relative to the tool shank. The bump-off surface of the lower portion of the sleeve member extends radially outward with respect to the coupling pin by a distance, D, and contacts the actuation screw when moving the replaceable cutting insert from a clamped position to a bump-off position, thereby providing enhanced bump-off capability.

In another aspect, a modular drill with enhanced bump-off capability comprises a tool shank having a pocket with a central floor portion, and a bore extending downward from the central floor portion, the bore having an upper portion and a reduced-diameter lower portion. A replaceable cutting head at least partially disposed within the pocket of the tool shank with an interference fit, the replaceable cutting head including a bore with a threaded upper portion and a non-threaded lower portion. A coupling pin assembly comprises a sleeve member and a coupling pin at least partially disposed within the sleeve member. The sleeve member includes an upper portion capable of being received in the non-threaded lower portion of the replaceable cutting head. The sleeve member further includes a lower portion having a non-circular cross-sectional shape with a bump-off surface. The lower portion of the sleeve member is capable of being received in the upper portion of the bore of the tool shank. The coupling pin includes an upper portion with a threaded portion capable of being received in the threaded upper portion of the replaceable cutting head. The coupling pin further includes a lower portion configured to make partial contact with the reduced-diameter lower portion of the bore of the tool shank. An actuation screw contacts the coupling pin assembly and causes the replaceable cutting head to move relative to the tool shank. The bump-off surface of the lower portion of the sleeve member extends radially outward with respect to the coupling pin by a distance, D, and contacts the actuation screw when moving the replaceable cutting insert from a clamped position to a bump-off position, thereby providing enhanced bump-off capability In yet another aspect, a method for a rotary cutting tool with enhanced bump-off capability, the rotary cutting tool comprising a tool shank; a replaceable cutting head; a coupling pin assembly at least partially received within a bore of the tool shank, the coupling pin assembly comprising a sleeve member and a coupling pin at least partially disposed within the sleeve member, the sleeve member including an upper portion and a lower portion having a non-circular cross-sectional shape with a bump-off surface extending radially outward with respect to the coupling pin by a distance, D; and an actuation screw for contacting the coupling pin assembly and causing the replaceable cutting head to move relative to the tool shank, the method comprising:

rotating the actuation screw in a first direction until a portion of the actuation screw is disposed within the reduced-diameter lower portion of the bore of the tool shank;

inserting the replaceable cutting head into a pocket of the tool shank until the replaceable cutting head contacts the actuation screw;

rotating the actuation screw in a second direction until the portion of the actuation screw is no longer disposed within the reduced-diameter lower portion of the bore of the tool shank, thereby causing the replaceable cutting head to move downward into the pocket and the sleeve member of the coupling pin assembly to contact the actuation screw; and rotating the actuation screw in the first direction until the actuation screw contacts a contact surface of the coupling pin and placing the replaceable cutting head in a clamped position.

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION OF THE DISCLOSURE

Figure 1:
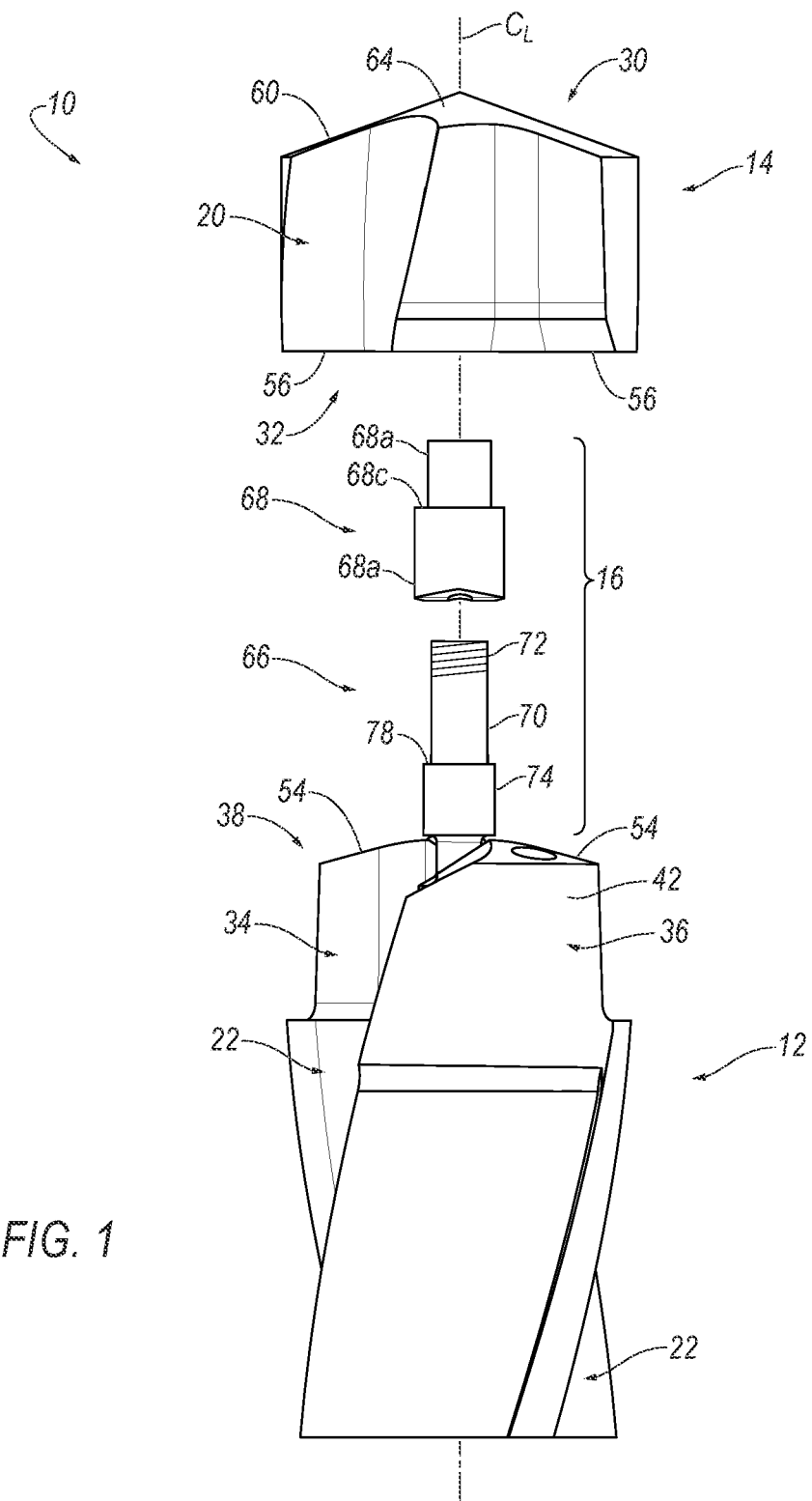
FIG. 1 is a partial, enlarged, exploded side view of a rotary cutting tool, such as a modular drill, according to an embodiment of the disclosure.

Referring now to FIGS. 1-7, a rotary cutting tool 10 is shown according to an embodiment of the disclosure. In general, the rotary cutting tool comprises a modular drill that includes a tool shank and a replaceable cutting head, which engages the tool shank when the modular drill is assembled. Although the cutting tool comprises a modular drill in the illustrated embodiment, it should be appreciated that the principles of the disclosure can be applied to any rotary cutting tool with a replaceable cutting tip for metal cutting operations, such as a milling tool or another type of rotating tool, for example a reamer, a tap, and the like. In addition, the description herein of specific applications should not be a limitation on the scope and extent of the use of the rotary cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" or "elongated" is defined as something that is longer than it is wide. In other words, the width is smaller than its length.

As used herein, the term "circular" is defined as an object having a shape of a circle, i.e., an object having a simple closed shape. It is the set of points in a plane that are at a given distance from a given point, the center; equivalently it is the curve traced out by a point that moves in a plane so that its distance from a given point is constant. The distance between any of the points and the center is called the radius.

As used herein, the term "stadium" is defined as a two-dimensional geometric shape constructed of a rectangle with semicircles at a pair of opposite sides. The same shape is also known as a discorectangle, obround, or sausage body. A stadium may be constructed as the Minkowski sum of a disk and a line segment. Alternatively, it is the neighborhood of points within a given distance from a line segment. A stadium is a type of oval. However, unlike some other ovals, such as the ellipses, it is not an algebraic curve because difference parts of its boundary are defined by different equations.

As used herein, a "pair of angled surfaces" is defined as any two surfaces that are not parallel to each other, i.e., form a positive relative angle.

As used herein, a "screw" is defined as a threaded fastener having a tapered or non-tapered shank with a helical thread and is driven by rotating the shank with a tool.

Figure 2:
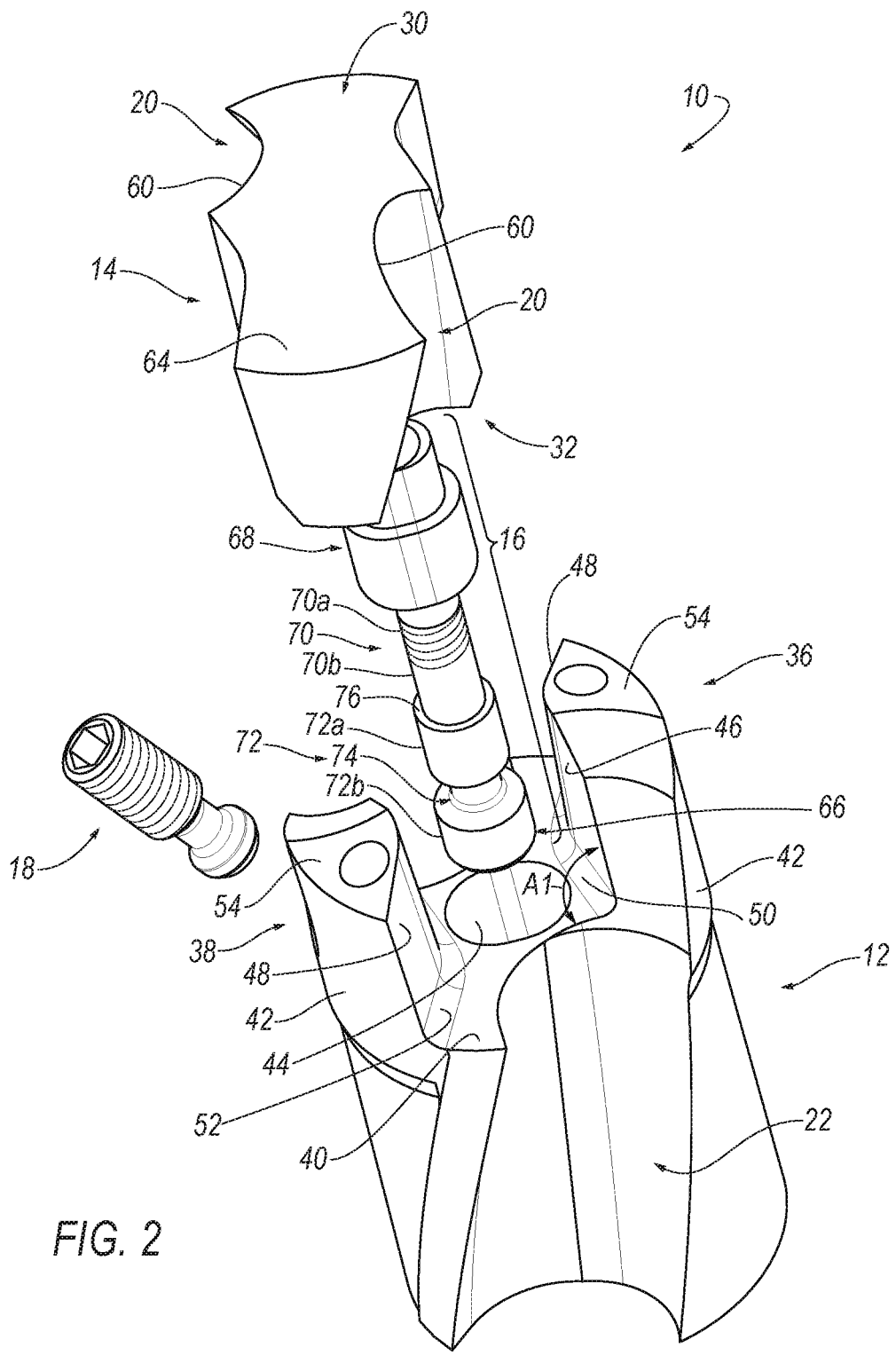
FIG. 2 is a partial, enlarged, exploded top perspective view of the modular drill of FIG. 1.
Figure 3:
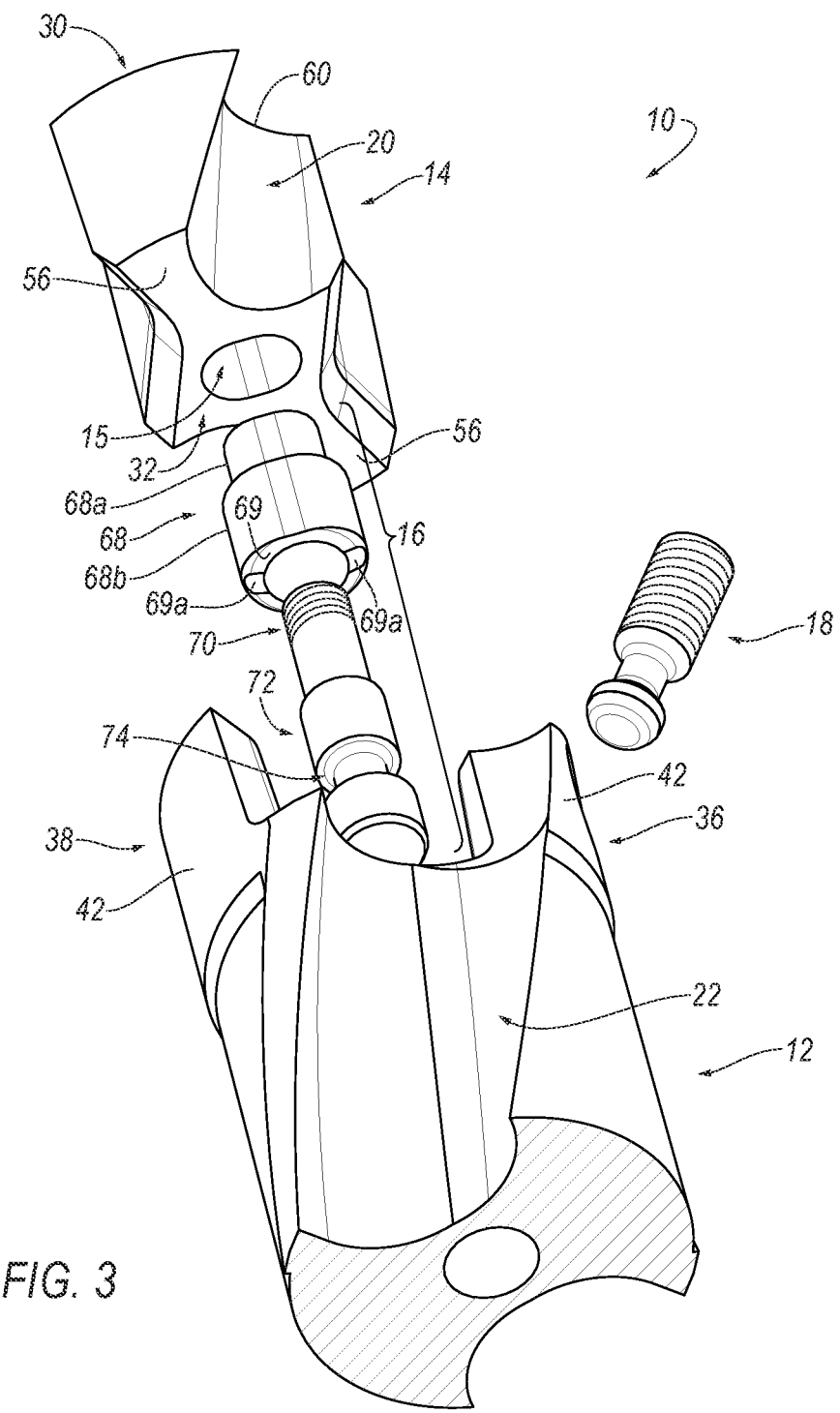
FIG. 3 is a partial, enlarged, exploded bottom perspective view of the modular drill of FIG. 1.

Referring now to FIGS. 1-3, the modular drill 10 has four basic components:
1) a tool shank 12;
2) a replaceable cutting head 14;
3) a coupling pin assembly 16; and
4) an actuation member 18.

It should be noted that the coupling pin assembly 16 can be integrally formed with the cutting head 14, and therefore the modular drill 10 can comprise only three basic components: the tool shank 12, the replaceable cutting head 14 with the integral coupling pin assembly 16, and the actuation member 18. In addition, the coupling pin assembly 16 can be of unitary construction.

Referring now to FIGS. 1-4, two flutes are provided in diametric opposition to one another, only one flute being visible in some drawings. The visible flute has a lateral recess forming part of a flute or cutting head flute portion 20 formed in cutting head 14. A corresponding or complementing lateral recess or shank flute portion 22 is formed in the shank 12. It should be appreciated that the invention is not limited by the number of flute portions, and that the invention can be practiced with any desirable number of flutes, depending on the physical dimensions of the cutting tool 10.

In the depiction of FIGS. 1-4, the cutting head flute portion 20 emerges at a leading end 30 of the cutting tool 10. The leading end 30 is defined for semantic purposes and is that end that engages a work piece (not shown) during a cutting operation. During cutting operations, the cutting tool 10 is mounted in the rotary cutting tool, rotated, and advanced progressively into the work piece (not shown) as cutting progresses. That end of the cutting head 14 opposite the leading end 30 is termed the trailing end 32. The terms "leading end" and "trailing end" are semantic devices that apply equally to the shank 12 and the cutting head 14 as they connote directional orientation with respect to a central, longitudinal axis, $C_L$, rather than specific structure. The leading end 30 is that which penetrates a work piece (not shown), and the trailing end 32 is that end opposed to the leading end 30.

Figure 5:
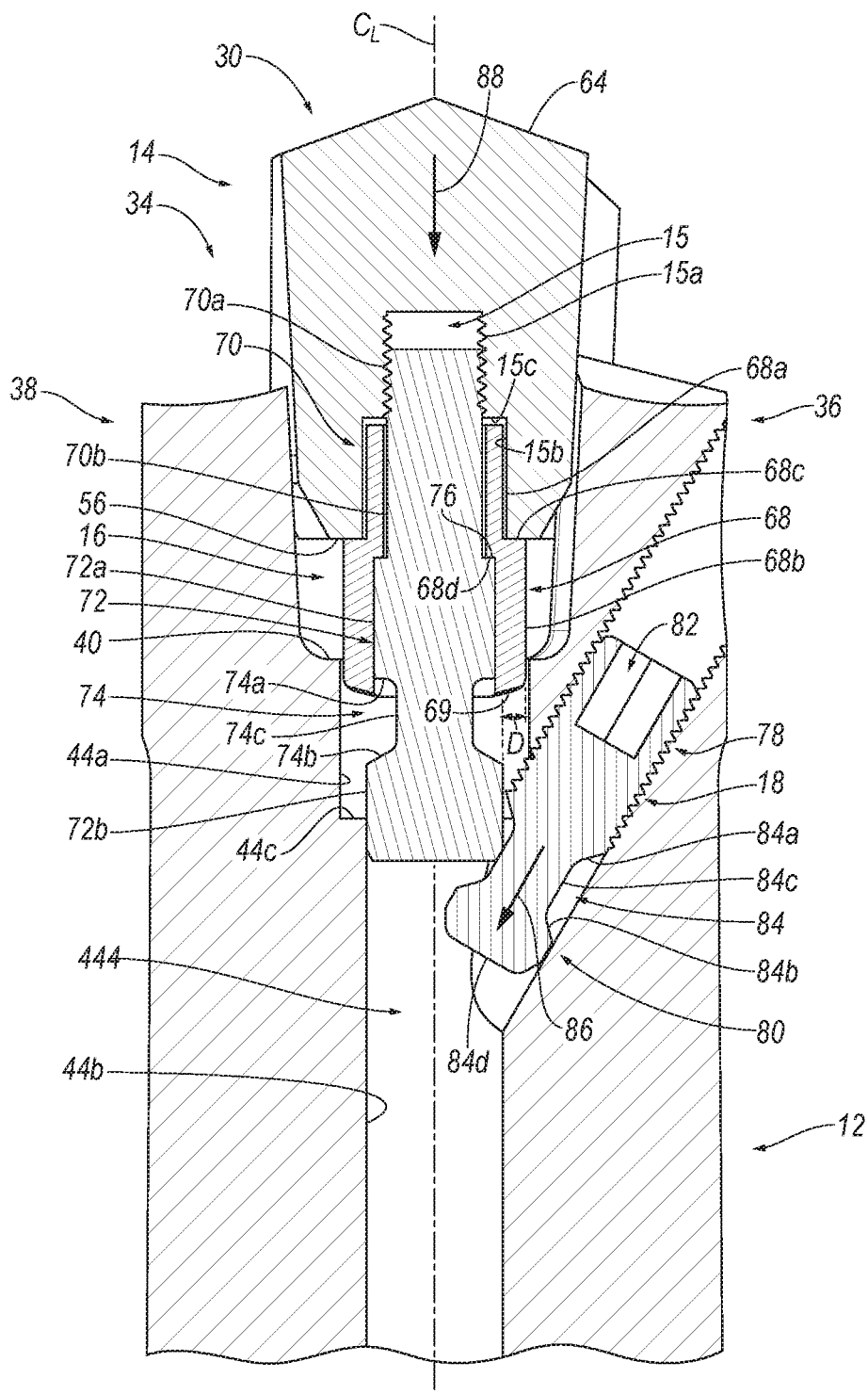
FIG. 5 is an enlarged cross-sectional view taken along line A-A on the central, longitudinal axis, $C_L$, of FIG. 4 showing the neck portion of the actuation screw contacting the lower portion of the coupling pin assembly to place the replaceable cutting head in an initial insertion position according to the disclosure.

The portion of the shank 12 that couples to and rotates the cutting head 14 is referred to as a pocket 34. The principal elements of the pocket 34 include two generally symmetrical and similar castellated wall sections 36, 38. The wall section 36 will be described, it being understood that wall section 38 is a generally symmetrical counterpart thereof. Each wall section 36, 38 is essentially a continuation of the body of shank 12 that projects upwardly from a central floor portion 40 of the shank 12 along the outer periphery of shank 12. Each wall section 36, 38 has a smooth outer surface 42 that conforms to and is generally coextensive with the generally cylindrical outer surface of the cutting tool 10. A bore 44 extends downward from the central floor portion 40 of the tool shank 12 for accommodating a portion of the coupling pin 16. As shown in FIG. 5, for example, the bore 44 has a relatively large diameter upper portion 44a, a reduced-diameter lower portion 44b, and a ledge 44c formed by the difference in the diameters between the upper portion 44a and the lower portion 44b.

Referring back to FIGS. 1-3, each wall section 36, 38 has a planar, torque transmission wall 46, a planar, vertically angled centering wall 48, and blends 50, 52, respectively, between the vertically angled retention surfaces 46, 48 and the central floor portion 40. The term "vertically angled" is defined as being formed at a non-zero angle, A1, (i.e. non-parallel) with respect to the central, longitudinal axis, $C_L$, of the cutting tool 10. In other words, the angle, A1, of the vertically angled retention surfaces 46, 48 is not equal to 90 degrees (i.e. non-perpendicular) with respect to the central floor portion 40 of the tool shank 12. The angle, A1, of the retention surfaces 46, 48 can be between about 92 degrees and about 95 degrees with respect to the central floor portion 40 of the tool shank 12, as shown in FIG. 2. The blends 50, 52 located between walls 46, 48 provide a smooth transition between the walls 46, 48, thereby reducing stresses caused by the interference fit between the tool shank 12 and the cutting head 12, and a reduction of stresses on the cutting tool 10 generated during machining operations. In the illustrated embodiment, the blends 50, 52 have an arcuate profile. However, it will be appreciated that the blends 50, 52 can have any desirable profile to reduce stresses by providing a break or relief between the wall 46, 48.

Each wall section 36, 38 has a top surface 54 that may or may not engage the replaceable cutting head 14 during assembly of the cutting tool 10. One top surface 54 is located oppositely (i.e., 180 degrees) of the other top surface 54. Each top surface 54 is complementary in shape with bottom surfaces 56 (FIG. 3) of the replaceable cutting head 14.

The cutting head 14 has at least two main cutting edges 60 (only one main cutting edge is visible in FIG. 1), a peripheral generally cylindrical outer surface 62, and a leading conical surface 64, which is interrupted or incomplete due to presence of the flutes 20.

As shown in FIGS. 1-3, the coupling pin assembly 16 includes a coupling pin 66 and a sleeve member 68. As mentioned earlier, the coupling pin 66 and the sleeve member 68 can be of unitary construction. In addition, the coupling pin assembly 16 can be made of any suitable material, such as carbide, steel and the like. In general, the coupling pin 66 includes a generally cylindrical-shaped upper portion 70 and a relatively larger diameter cylindrical-shaped lower portion 72. The upper portion 70 has a threaded portion 70a proximate the end and a non-threaded portion 70b adjoining the threaded portion 70a. As shown in FIGS. 5-13, the threaded portion 70a is capable of being threaded into a threaded bore 15 formed in the cutting head 14.

Figure 4:
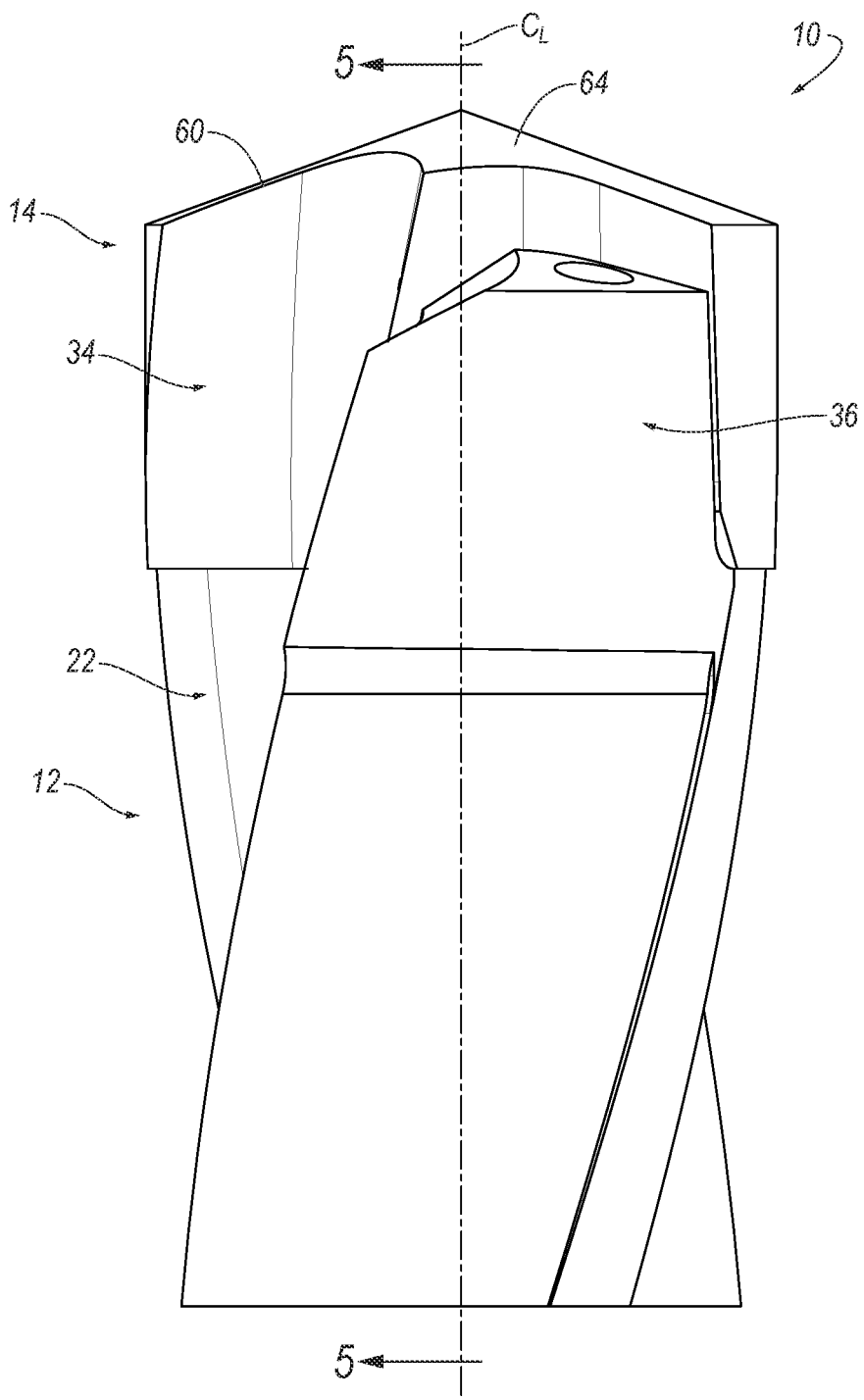
FIG. 4 is a partial, enlarged, exploded side elevational view of the modular drill of FIG. 1 when the replaceable cutting head is in a clamped position.
Figure 10:
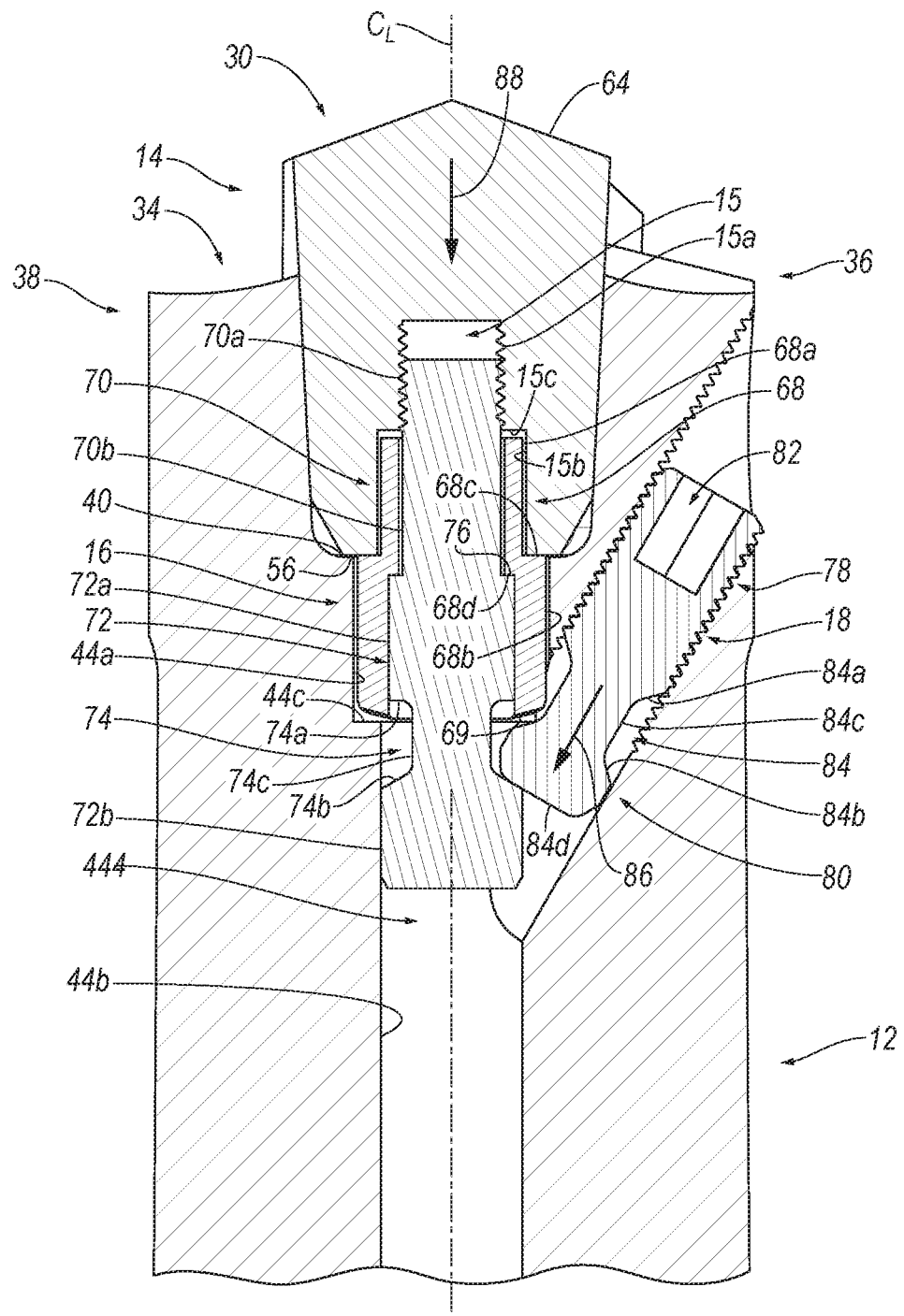
FIG. 10 is an enlarged cross-sectional view taken along line A-A on the central, longitudinal axis, $C_L$, of FIG. 4 showing the replaceable cutting head in a clamped position according to the disclosure.

Referring back to FIGS. 1-3, the relatively larger diameter lower portion 72 has a generally cylindrical-shaped upper portion 72a proximate the non-threaded portion 70a, a generally cylindrical-shaped lower portion 72b, and a recess or notch 74 disposed between the upper portion 72a and the lower portion 72b. The recess or notch 74 is defined by an upper surface 74a, a lower surface 74b and an inner cylindrical wall 74c disposed therebetween. The lower surface 74b acts as a clamping surface that contacts the actuation screw 18 to clamp the replaceable cutting head 14 within the pocket 34 of the tool shank 12 when the cutting tool 10 is placed in the clamped position, as shown in FIGS. 4 and 10.

A ledge 76 is formed at the intersection between the non-threaded portion 70b and the relatively larger diameter upper portion 72a. In one embodiment, the recess or notch 74 has an outer diameter that is substantially equal to the outer diameter of the cylindrical-shaped shaft 70. In another embodiment, the recess or notch 76 has a different outer diameter than the cylindrical-shaped shaft 70. The diameter of the lower portion 72b is slightly less than the diameter of the lower portion 44b of the bore 44 formed in the shank flute portion 22 of the tool shank 12 to enable the coupling pin 66 to be at least partially received within the bore 44 of the tool shank, as shown in FIGS. 5-13.

Referring to FIGS. 1-3 and 5, the sleeve member 68 includes a generally non-cylindrical upper portion 68a and a non-cylindrical lower portion 68b extending radially outward with respect to the upper portion 68a. The non-cylindrical upper portion 68a prevents rotation of the sleeve member 68 during assembly. Because the lower portion 68b extends radially outward with respect to the upper portion 68a, an outer ledge 68c is formed at the intersection between the upper portion 68a and the lower portion 68b. Similarly, an inner ledge 68d is formed at the intersection between the upper portion 68a and the lower portion 68b because the inner diameter of the upper portion 68a is smaller than the inner diameter of the lower portion 68b. The outer ledge 68c contacts the contact surface 56 of the cutting head 12 and acts as a stop to prevent unwanted axial movement of the coupling pin assembly 16 during assembly. Similarly, the inner ledge 68d contacts the ledge 76 of the coupling pin 66 and acts as a stop when the coupling pin 66 is inserted into the sleeve member 68.

In one aspect, the non-cylindrical lower portion 68b has a cross-sectional shape of a stadium, and the like, that extends radially outward with respect lower portion 72b of the coupling pin 66. In the illustrated embodiment, the non-cylindrical lower portion 68b extends at least a distance, D, with respect to the lower portion 72b of the coupling pin 66. The distance, D, may be expressed as a ratio of the cutting diameter of the replaceable cutting head 14. For example, the ratio between the distance, D, and the cutting diameter of the replaceable cutting head 14 can be between in a range between about 0.02 and about 0.12. Thus, for a replaceable cutting head having a cutting diameter of about 16 mm, the distance, D, would be in a range between about 0.3 mm and about 2.0 mm.

It will be appreciated that the invention is not limited by the lower portion 68b having a stadium cross-sectional shape, and that other non-circular cross-sectional shapes are within the scope of the invention. For example, the lower portion 68b can have a cross-sectional shape of an oval, an ellipse, an oblong, and the like. The lower portion 68b may include a bottom surface 69 with a pair of non-planar bump-off surfaces 69a. In one embodiment, the bump-off surface 69a have a convex shape. It has been found that the convex shape of the bump-off surface 69a distributes the compressive stresses during bump-off of the replaceable cutting insert 14 from the tool shank 12 over a larger surface area, as compared to conventional cutting tools.

As shown in FIG. 5, for example, a bore 15 (i.e., blind hole) is formed in the trailing end 32 of the replaceable cutting head 14. The bore 15 has a threaded upper portion 15a and a non-threaded lower portion 15b having a relatively larger size than the threaded upper portion 15a. The threaded upper portion 15a of the bore 15 is capable of receiving the upper threaded portion 70a of the coupling pin 66 and the non-threaded lower portion 15b is capable of receiving the upper portion 68a of the sleeve member 68.

To assemble the coupling pin assembly 16 to the cutting head 14, the coupling pin 66 is inserted into the sleeve member 68 until the outer ledge 68d of the sleeve member 68 contacts the ledge 76 of the coupling pin 66. Then, the threaded portion 70a of the coupling pin 66 is screwed into the threaded upper portion 15a of the replaceable cutting head 14 until the outer ledge 68c of the sleeve member 68 contacts the contact surface 56 of the replaceable cutting head 14. In this manner, the cutting head 14 and the coupling pin assembly 16 are screwed together when assembling the cutting tool 10. It should be noted that both the replaceable cutting head 14 and the coupling pin assembly 16 can be supplied assembled together as the manufacturing cost of the coupling pin assembly 16 is very low when compared to the replaceable cutting head 14.

As shown in FIGS. 2, 3 and 5, the actuation member 18 generally comprises an upper threaded portion 78 and a non-threaded lower portion 80. In one embodiment, the actuation member 18 comprises a setscrew having a recess 82 capable of receiving a tool, such as an Allen wrench, and the like, to cause the setscrew 18 to be translated in a reciprocating fashion within a threaded bore 82 in the tool shank 12. The non-threaded lower portion 80 has a neck region 84 defined by an upper conical surface 84a, a lower conical surface 84b, a reduced-diameter surface 84c, and a substantially planar bottom surface 84d.

Referring now to FIGS. 5-10, once the coupling pin assembly 16 is properly threaded into the replaceable cutting head 14, the replaceable cutting head 14 can be assembled to the tool shank 12 in a clamped position. To assemble the replaceable cutting head 14 to the tool shank 12 in the clamped position, the operator may need to rotate the actuation screw 18 in a first direction, for example, a clockwise direction into the threaded bore 82 to move the actuation screw 18 in the direction of the arrow 86 (i.e., first direction) until the non-threaded lower portion 80 of the actuation screw 18 extends at least partially into the lower portion 44b of the bore 44. Rotating the actuation member 18 in a first direction, such as clockwise, causes the actuation member 18 to move in the direction of the arrow 86, as shown in FIG. 5. Of course, rotating the actuation member 18 in a second, opposite direction, such as counterclockwise, causes the actuation member 18 to move in an opposite direction as the direction of the arrow 86.

Next, the operator can look into the bore 44 and visually verify that the actuation screw 18 has been properly threaded into the bore 82. Then, the operator can hold the replaceable cutting head 14 with one hand and move the replaceable cutting head 14 towards the tool shank 12 (i.e., in the direction of the arrow 88 in FIG. 5) and into the pocket 34 until the lower portion 72b of the coupling pin 66 makes partial contact with the bore 44 and the lower portion 72b of the coupling pin 66 makes contact with the reduced-diameter surface 84c of the neck region 84 of the actuation screw 18, as shown in FIG. 5. At this point, the replaceable cutting head 14 is in an initial insertion position. It should be noted that in this initial insertion position, the replaceable cutting head 14 is positioned in a relatively high vertical position within the pocket 34, and therefore can be easily inserted and/or removed from the tool shank 12.

Figure 6:
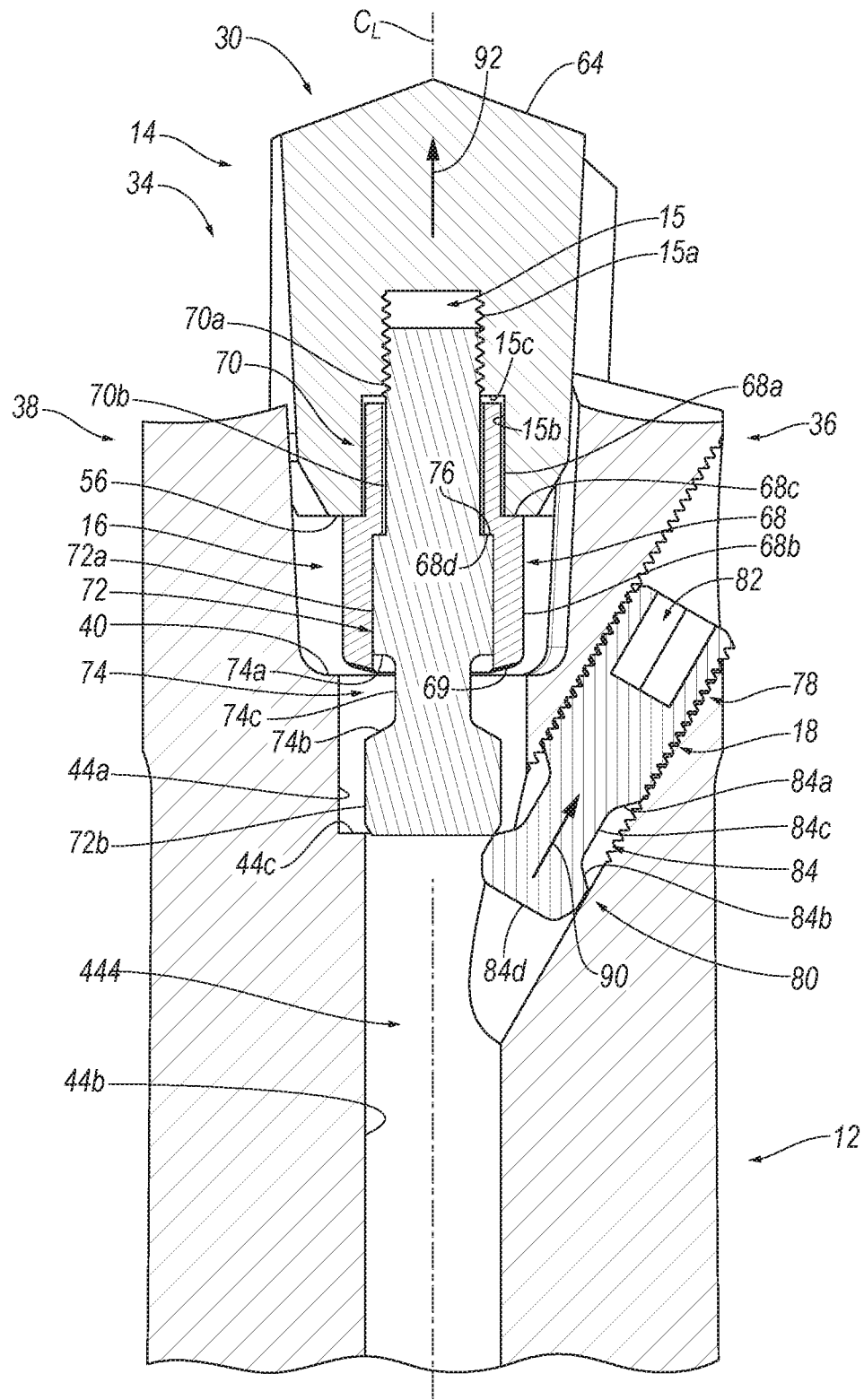
FIG. 6 is an enlarged cross-sectional view taken along line A-A on the central, longitudinal axis, $C_L$, of FIG. 4 showing the neck portion of the actuation screw no longer contacting the lower portion of the coupling pin assembly to place the replaceable cutting head in a second insertion position according to the disclosure.

Next, the actuation screw 18 is rotated in a second direction, for example, in a counterclockwise direction, to move the setscrew 18 in the direction of the arrow 90, as shown in FIG. 6. Rotation of the actuation screw 18 causes the coupling pin 16 to no longer contact the reduced-diameter surface 84c of the neck portion 84 of the actuation screw 18, but to contact the lower conical surface 84b of the actuation screw 18. As a result, the replaceable cutting head 14 moves slightly vertically upward (as indicated by the arrow 92) within the bore 44 with respect to the initial insertion position shown in FIG. 5. However, the coupling pin assembly 16 still makes partial contact with the bore 44. At this point, the replaceable cutting insert 14 is in a second insertion position.

Figure 7:
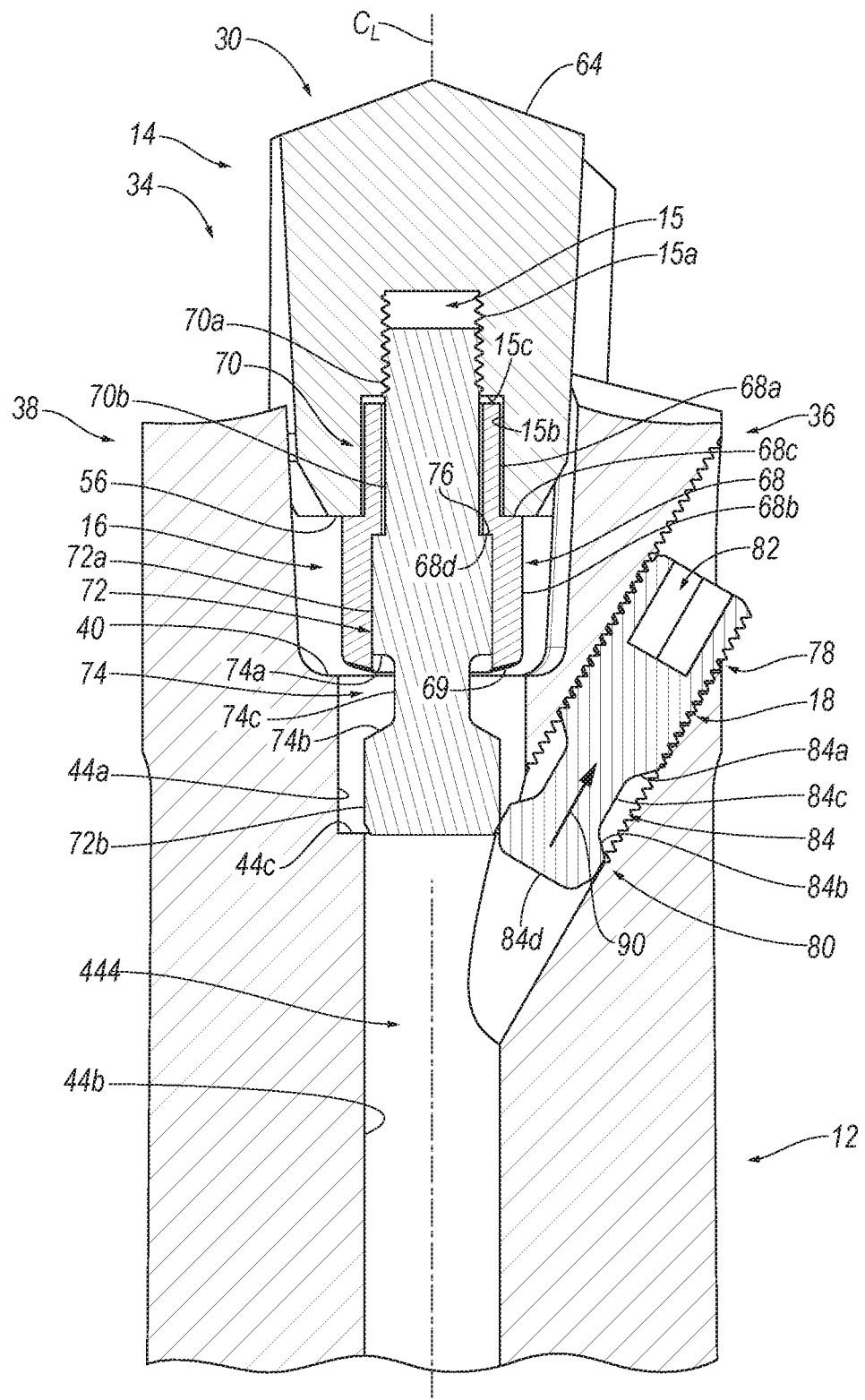
FIG. 7 is an enlarged cross-sectional view taken along line A-A on the central, longitudinal axis, $C_L$, of FIG. 4 showing the neck portion of the actuation screw no longer contacting the lower portion of the coupling pin assembly to place the replaceable cutting head in a third insertion position according to the disclosure.

As the actuation screw 18 is continued to be rotated in the second direction, the actuation screw 18 moves in the direction of the arrow 90 until the lower conical surface 84b of the actuation screw 18 no longer contacts the lower portion 72b of the coupling pin 16, as shown in FIG. 7. At this point, the replaceable cutting insert 14 is in a third insertion position. In this position, the frictional force between the actuation screw 18 and the coupling pin assembly 16 causes the replaceable cutting insert 14 to remain substantially stationary within the pocket 34 of the tool shank 12.

Figure 8:
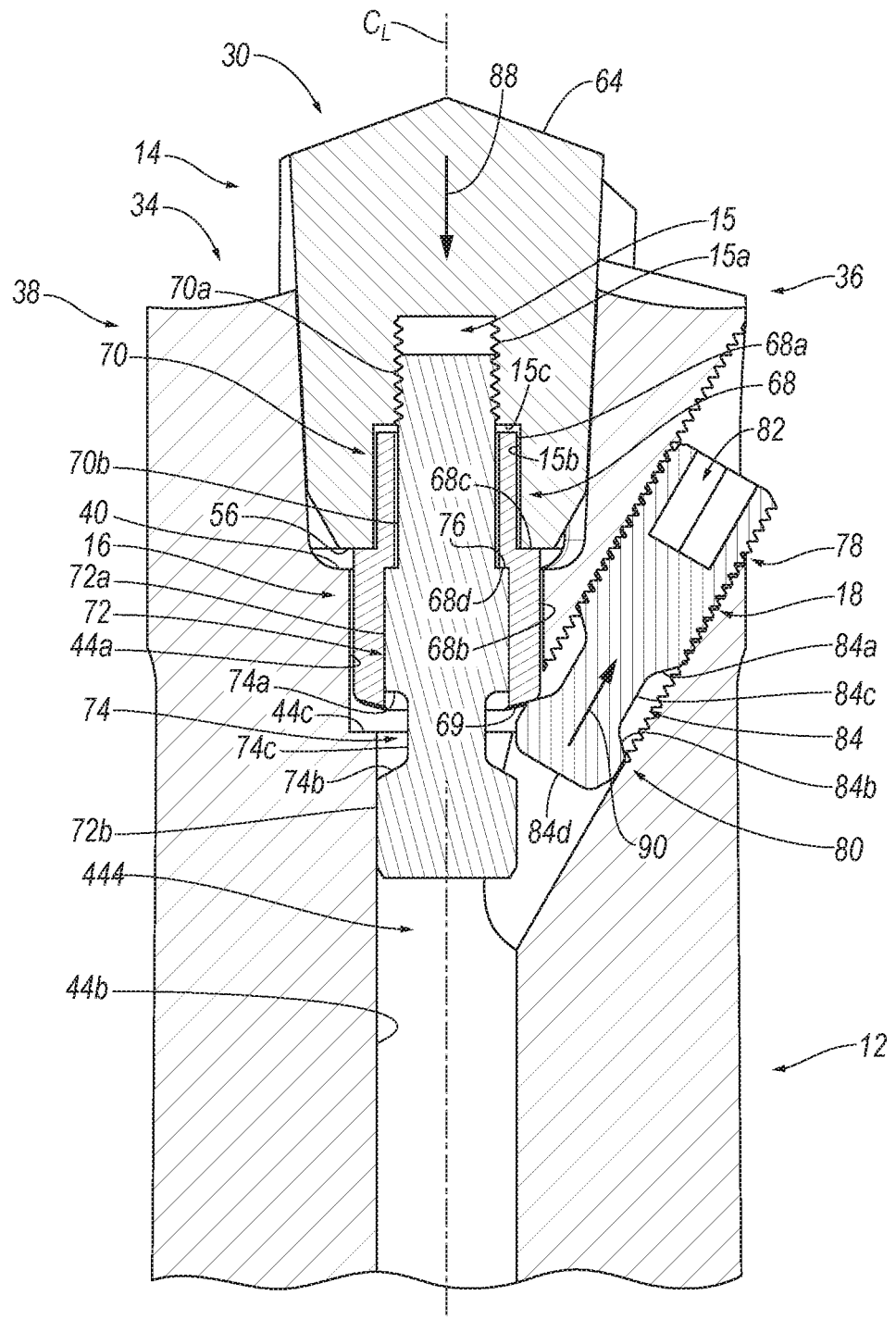
FIG. 8 is an enlarged cross-sectional view taken along line A-A on the central, longitudinal axis, $C_L$, of FIG. 4 showing the lower conical surface of the actuation screw contacting the bottom surface of the sleeve member to place the replaceable cutting head in a fourth insertion position according to the disclosure.

Once the actuation screw 18 is moved a sufficient distance in the direction of the arrow 90, the force exerted by gravity exceeds the frictional force between the actuation screw 18 and the coupling pin assembly 16. In the event the drill assembly 10 is positioned such that gravity does not exceed the frictional force between the actuation screw 19 and the coupling pin assembly 16, the operator can apply a light pressure to the replaceable cutting insert 14 to keep the insert in contact with the actuation screw 18. As a result, the replaceable cutting insert 14 moves into the bore 44 (in the direction of the arrow 88) until the bottom surface 69 of the sleeve member 68 of the coupling pin 16 engages the lower conical surface 84b of the actuation screw 18, as shown in FIG. 8. This engagement occurs because the sleeve member 68 extends radially outward with respect to the lower portion 72b of the coupling pin 66 by the radial distance, D. At this point, the replaceable cutting insert 14 is in a fourth insertion position. One aspect of the invention is that in this third insertion position, the replaceable cutting head 14 is automatically positioned to be securely clamped into the tool shank 12 by the actuation screw 18.

Figure 9:
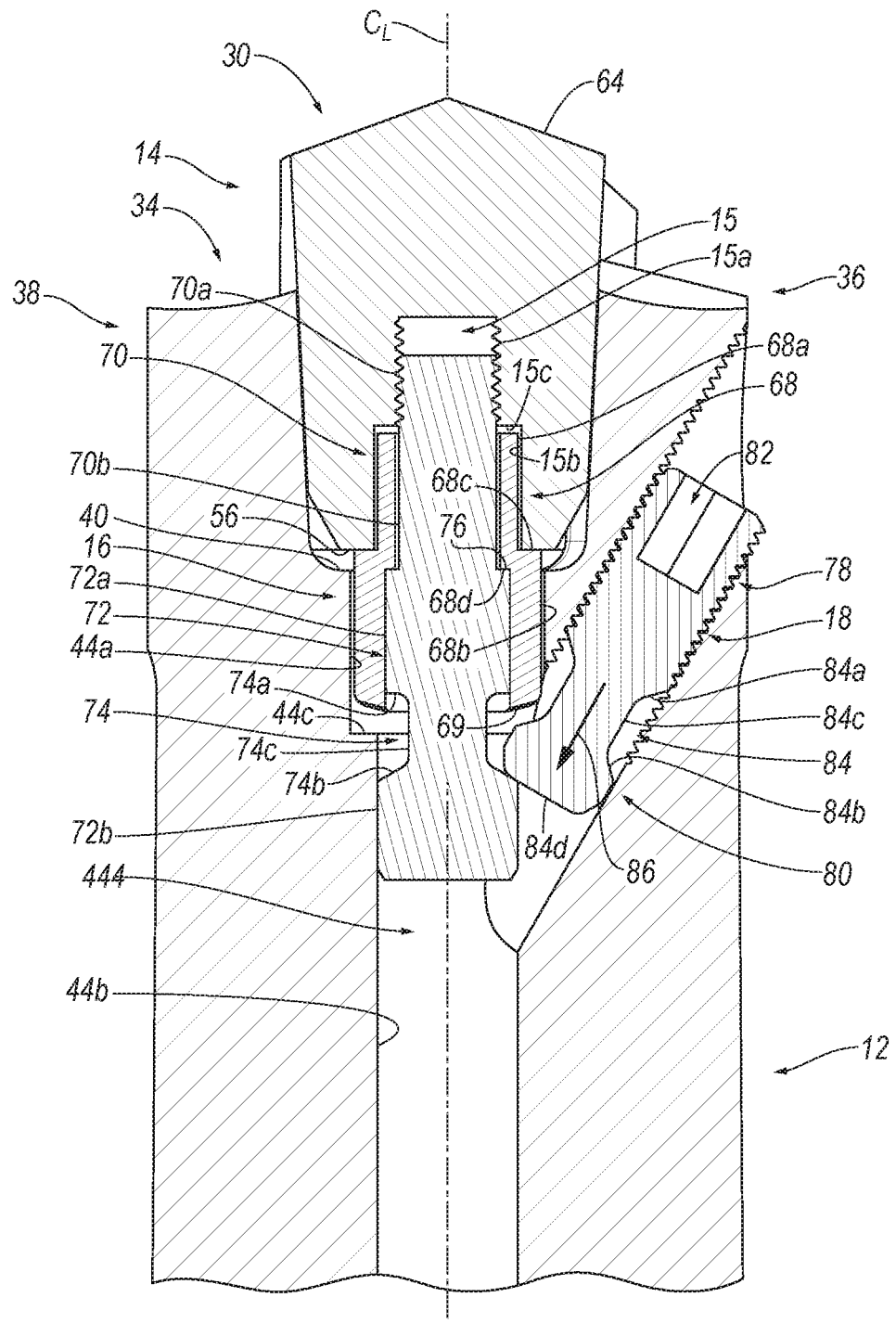
FIG. 9 is an enlarged cross-sectional view taken along line A-A on the central, longitudinal axis, $C_L$, of FIG. 4 showing the bottom surface of the actuation screw contacting the lower portion of the coupling pin assembly to place the replaceable cutting head in a fifth insertion position according to the disclosure.

Next, the actuation screw 18 is rotated in the first direction, for example, in a clockwise direction to move the actuation screw 18 in the direction of the arrow 86 until the bottom surface 84d of the actuation screw 18 engages the lower clamping surface 74b of the coupling pin assembly 16, as shown in FIG. 9. At this point, the replaceable cutting insert 14 is in a fifth insertion position. In this position, the contact surface 56 of the replaceable cutting insert 14 does not contact the floor 40 of the pocket 34 of the tool shank 12.

Then, the actuation screw 18 is continued to be rotated in the first direction causing the replaceable cutting insert 14 to be moved in a vertically downward direction, as indicated by the arrow 86, until the contact surface 56 of the replaceable cutting head 14 contacts the central floor portion 40 of the pocket 34 of the tool shank 12. It should be noted that this downward movement of the replaceable cutting insert 14 causes the wall sections 36, 38 of the tool shank 12 to deform and move radially outward with respect to each other, thereby producing an interference fit between the replaceable cutting insert 14 and the tool shank 12. It should also be noted that the ledge 44c should not contact the sleeve member 68 and a small gap will exist therebetween. At this point, the replaceable cutting head 14 is in the clamped position and tightly secured to the tool shank 12, as shown in FIG. 10.

Figure 11:
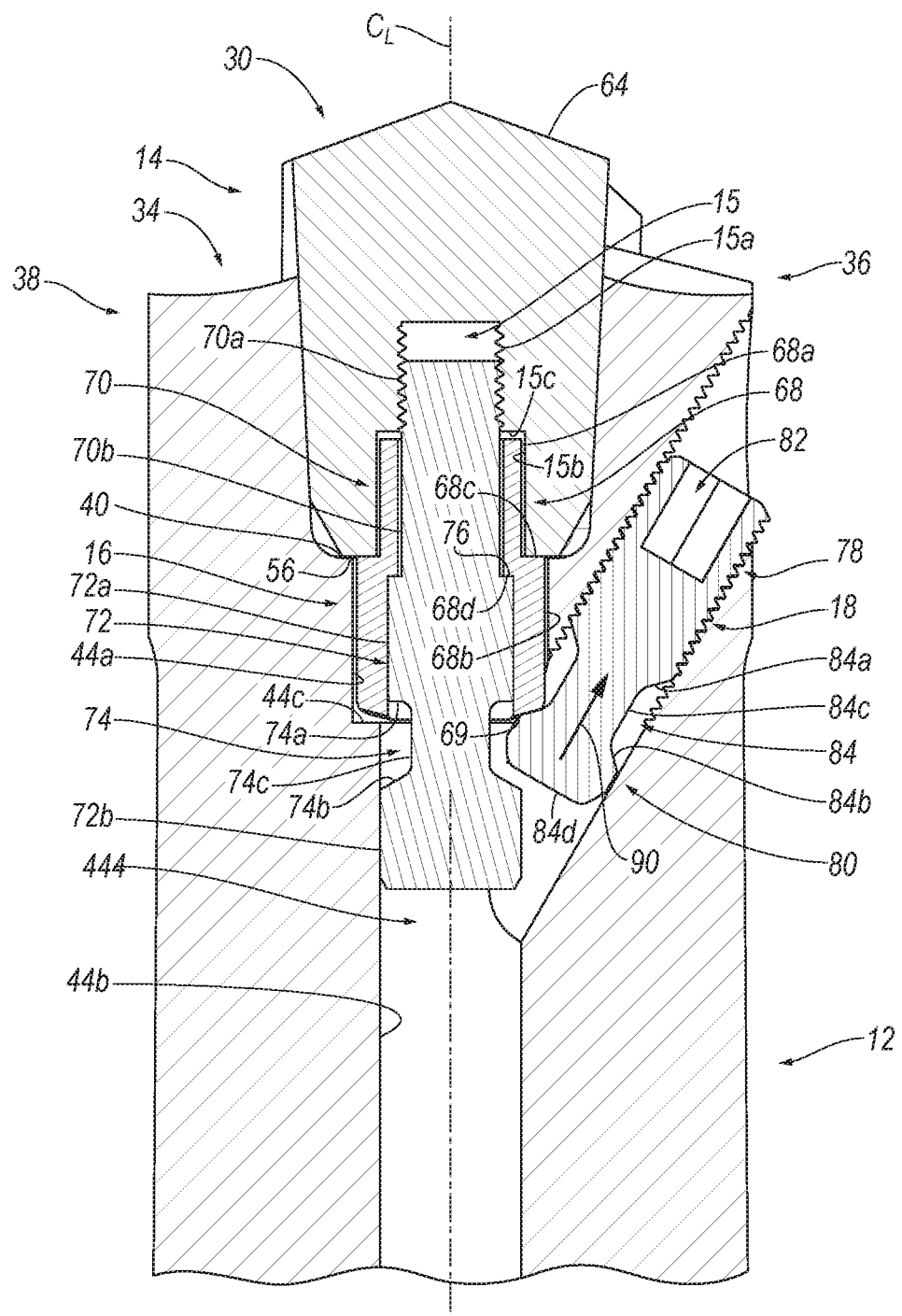
FIG. 11 is an enlarged cross-sectional view taken along line A-A on the central, longitudinal axis, $C_L$, of FIG. 4 showing the lower portion of the actuation screw contacting the bump-off surface on the bottom surface of the sleeve member of the coupling pin assembly to place the replaceable cutting head in an initial bump-off position according to the disclosure.
Figure 12:
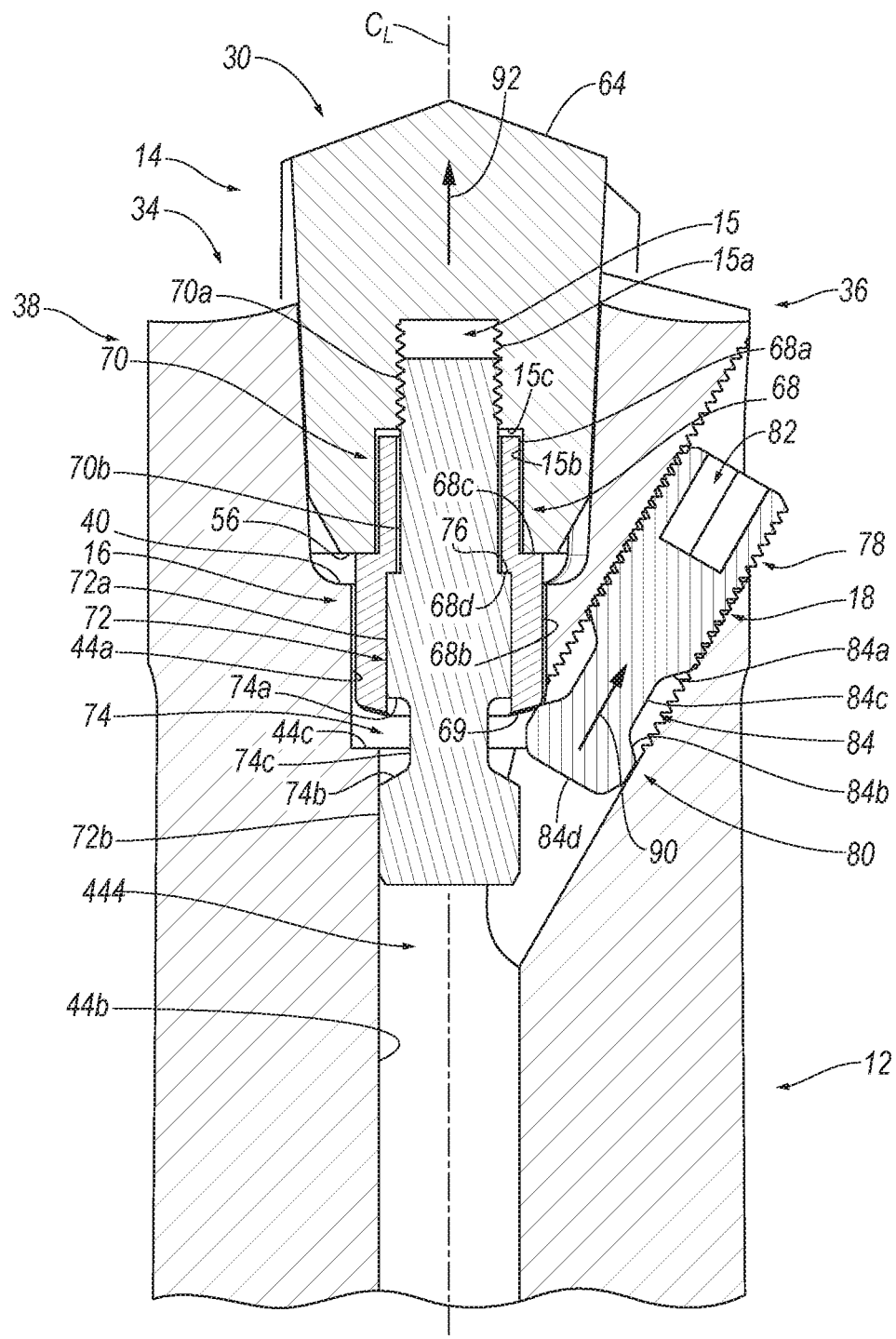
FIG. 12 is an enlarged cross-sectional view taken along line A-A on the central, longitudinal axis, $C_L$, of FIG. 4 showing the lower portion of the actuation screw contacting the bump-off surface on the bottom surface of the sleeve member of the coupling pin assembly to place the replaceable cutting head in a final bump-off position according to the disclosure.
Figure 13:
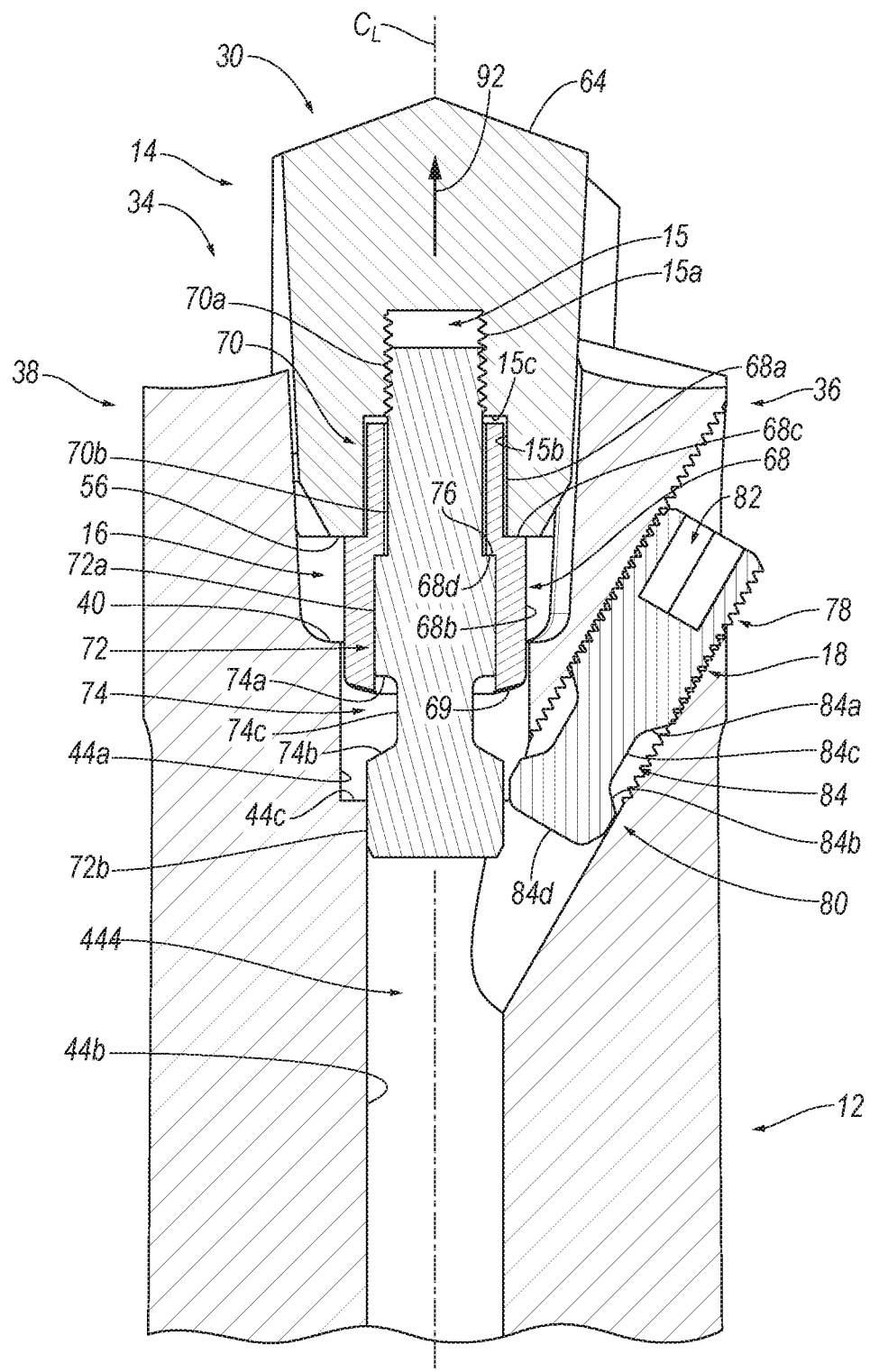
FIG. 13 is an enlarged cross-sectional view taken along line A-A on the central, longitudinal axis, $C_L$, of FIG. 4 showing the replaceable cutting head in a removal position according to the disclosure.

Referring now to FIGS. 11-13, removal of the replaceable cutting head 14 from the tool shank 12 due to, for example, wear, and the like, can be accomplished in the following manner. First, the actuation screw 18 is rotated in the first direction, for example, the counterclockwise direction, to move the actuation screw 18 in the direction of the arrow 90 until the lower conical surface 84b of the actuation screw 18 engages the lower portion 68b of the sleeve member 68 of the coupling pin assembly 16, as shown in FIG. 11. Specifically, the upper conical surface 84a of the actuation screw 18 contacts the concave surface 69a (FIG. 3) of the bottom surface 69 of the lower portion 68b of the sleeve member 68 to provide surface contact therebetween. As a result, the stresses during the bump-off of the replaceable cutting insert 14 from the pocket 34 of the tool shank 12 are minimized by distributing the stresses over a larger contact area, thereby providing enhanced bump-off capability, as compared to conventional bump-off designs that provide only line or point contact during bump-off. At this point, the replaceable cutting insert 14 is in an initial bump-off position.

In this initial bump-off position, it is noted that the replaceable cutting insert 14 remains substantially stationary and the contact surface 56 of the replaceable cutting insert 14 still is in contact with the central floor portion 40 of the pocket 34 of the tool shank 12. In addition, it is noted that the force required to move the cutting insert 14 out from this position is the maximum force required during the bump-off action, so the conical surfaces 84a, 84b have been designed to make surface contact when in the initial bump-off position. Once the actuation member 18 causes the cutting insert 14 to move from the initial bump-off position, the contact between the conical surfaces 84a, 84b will change from surface to line contact, but the required force will progressively diminish.

Next, the actuation screw 18 is continued to be rotated in the first direction to move the actuation screw 18 in the direction of the arrow 90 until the lower conical surface 84b of the setscrew 18 no longer engages the lower portion 68b of the sleeve member 68 of the coupling pin assembly 16, as shown in FIG. 12. This movement of the actuation screw 18 causes the replaceable cutting insert 14 to be moved in an upward vertical direction, as indicated by the arrow 92. Specifically, the force exerted by the actuation screw 18 against the sleeve member 68 of the coupling pin assembly 16 is sufficient to overcome the frictional forces from the interference fit between the replaceable cutting head 14 and the tool shank 12. As this point, the replaceable cutting insert 14 is in a final bump-off position. It is noted that a portion of the non-threaded lower portion 80 of the actuation screw 18 is not disposed within the bore 44 of the tool shank 12, but still contacts the sleeve member 68 because of the radial distance, D, between the sleeve member 68 and the lower portion 72b of the coupling pin assembly 16.

As shown in FIG. 13, the replaceable cutting head 14 is in a removal position. In this position, the operator can grasp and move the replaceable cutting insert 14 in an upward vertical direction, as indicated by the arrow 92, until the replaceable cutting head 14 is removed from the tool shank 12.

As described above, a rotary cutting tool with enhanced bump-off capability comprises a tool shank having a pocket. A replaceable cutting head is at least partially disposed within the pocket of the tool shank with an interference fit. A coupling pin assembly is at least partially received within a bore of the tool shank. The coupling pin assembly comprises a sleeve member and a coupling pin at least partially disposed within the sleeve member. The sleeve member includes an upper portion and a lower portion having a non-circular cross-sectional shape with a bump-off surface. The coupling pin includes an upper portion and a lower portion configured to make partial contact with the bore of the tool shank. An actuation screw contacts the coupling pin assembly and causes the replaceable cutting head to move relative to the tool shank. The bump-off surface of the lower portion of the sleeve member extends radially outward with respect to the coupling pin by the distance, D, and contacts the actuation screw when moving the replaceable cutting insert from a clamped position to a bump-off position, thereby providing enhanced bump-off capability.

Having described presently preferred embodiments the disclosure may be otherwise embodied within the scope of the appended claims.

What is claimed is:

1. A rotary cutting tool with enhanced bump-off capability, comprising:
   a tool shank having a pocket;
   a replaceable cutting head at least partially disposed within the pocket of the tool shank with an interference fit;
   a coupling pin assembly at least partially received within a bore of the tool shank, the coupling pin assembly comprising a sleeve member and a coupling pin at least partially disposed within the sleeve member, the sleeve member including an upper portion and a lower portion extending radially outward with respect to the upper portion and having a non-circular cross-sectional shape with a bump-off surface, the coupling pin including an upper portion and a lower portion configured to make partial contact with the bore of the tool shank; and
   an actuation screw for contacting the coupling pin assembly and causing the replaceable cutting head to move relative to the tool shank,
   wherein the bump-off surface of the lower portion of the sleeve member extends radially outward with respect to the coupling pin by a distance, D, and contacts the actuation screw when moving the replaceable cutting insert from a clamped position to a bump-off position, thereby providing enhanced bump-off capability.

2. The rotary cutting tool according to claim 1, wherein the non-circular lower portion of the sleeve member has a stadium cross-sectional shape.

3. The rotary cutting tool according to claim 1, wherein the lower portion of the coupling pin includes a recess having an upper surface and a lower clamping surface for contacting the actuation screw when placing the replaceable cutting head in the clamped position.

4. The rotary cutting tool according to claim 3, wherein the actuation screw has a threaded upper portion and a non-threaded lower portion.

5. The rotary cutting tool according to claim 4, wherein the non-threaded lower portion of the actuation screw includes a neck region defined by an upper conical surface, a lower conical surface, a reduced-diameter surface and a bottom surface.

6. The rotary cutting tool according to claim 5, wherein the bottom surface of the actuation screw contacts the clamping surface of the coupling pin when place the replaceable cutting head in the clamped position.

7. The rotary cutting tool according to claim 3, wherein the upper portion of the coupling pin includes a threaded portion for threading the coupling pin assembly into a bore of the replaceable cutting head.

8. The rotary cutting tool according to claim 1, wherein the bump-off surface is non-planar.

9. The rotary cutting tool according to claim 8, wherein the bump-off surface is convex-shaped.

10. The rotary cutting tool according to claim 1, wherein an outer ledge is formed at an intersection between the upper portion of the sleeve member and the lower portion of the sleeve member.

11. The rotary cutting tool according to claim 1, wherein a ratio between the distance, D, and a cutting diameter of the replaceable cutting head is between about 0.02 and about 0.12.

12. The rotary cutting tool according to claim 1, wherein the lower portion of the sleeve member has a bottom surface, and wherein the bump-off surface is located on the bottom surface of the sleeve member.

* * * * *